Dec. 22, 1959     D. B. LEWIS     2,918,138
DISPOSABLE AND CLEANABLE FILTER
Filed Feb. 13, 1957
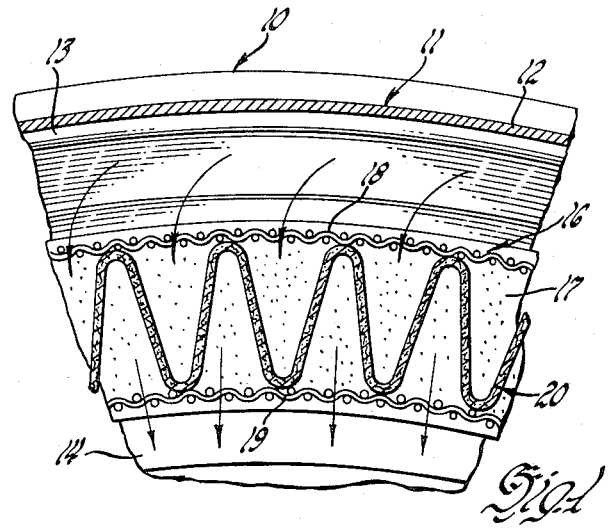
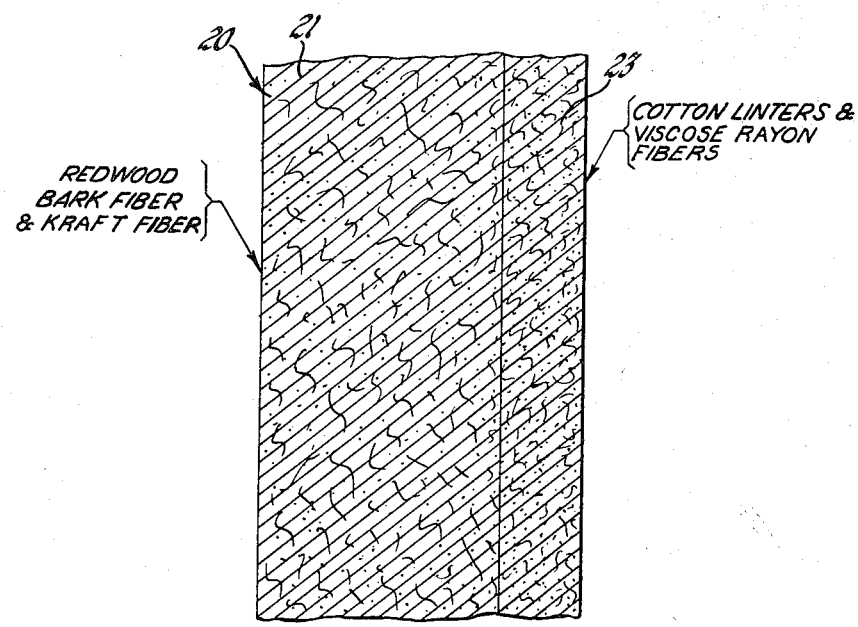
INVENTOR.
Donald B. Lewis
BY
L.D. Burch
ATTORNEY United States Patent Office 2,918,138
Patented Dec. 22, 1959

2,918,138

DISPOSABLE AND CLEANABLE FILTER

Donald B. Lewis, Lapeer, Mich., assignor to General Motors Corporation, Detroit, Mich., a corporation of Delaware Application February 13, 1957, Serial No. 639,900

1 Claim. (Cl. 183—69)

This invention relates to paper filter means for separating solid substances from gaseous substances and has particular relation to filter paper means especially applicable for filtering air supplied to induction systems of internal combustion engines for automotive and other similar uses.

It is proposed to provide multiphase filter paper composed of sheets having different properties that are desirable in filtering means, said properties of said different sheets being capable of supplementing one another to provide composite sheets having more of the properties which are desirable. It has been found that redwood bark matting is extremely porous and has great dust retaining capacity. However, such matting cannot be used as a filtering means where any degree of structural strength is required. It can only be used when some kind of a filter cloth is employed to support the fibers to prevent them from being pulled apart, and separating into bunches around which air will flow without being filtered. Such fibers also have poor filtering efficiency even when held together by filter cloth and for such reasons have heretofore been considered undesirable for filtering purposes.

It is now proposed to employ binder means to hold the redwood bark fibers in proper relation within a sheet formed of such fibrous material and to bind this sheet to a backing sheet having greater structural strength and better filtering efficiency.

In the drawing:

Figure 1 is a fragmentary cross sectional view of an air cleaner silencer assembly such as is employed in cleaning air supplied to the induction systems of internal combustion engines. The assembly illustrated has a filter element embodying filter paper constructed according to the principles of the invention.

Figure 2 is an enlarged cross sectional view of a sheet of filter paper such as is embodied in the filter element in the structure disclosed by Figure 1.

The cleaner silencer assembly 10 disclosed by Figure 1 embodies a casing 11 formed by walls 12 within which an air supply chamber 13 and an air distribution chamber 14 are provided. The air distribution chamber 14 is adapted to be connected to the induction system of an internal combustion engine to supply air for operating the engine. The air is adapted to be cleaned by filter unit 16 extending across the casing 11 between the supply chamber 13 and the distribution chamber 14. The filter unit 16 embodies spaced end walls or supports 17 engaging the walls of the casing 11 to retain the filter unit 16 in position in the casing and to seal the filter unit within the casing. The end walls or supports 17 may be held in spaced relation by screens 18 and 19 disposed on opposite sides of a pleated filter 20, also extending between the supports 17. The filter 20 has structural strength enough to support itself against the flow of air from the chamber 13 to the chamber 14 but in certain installations, may not have structural strength enough to support the walls 12 of the casing 11. The screens 18 and 19 serve this purpose and otherwise protect the filter 20 from injury. The filter 20 comprises a paper structure consisting of a plurality of sheets, one of which is indicated at 21. Sheet 21 is formed of redwood bark fibers which have been sufficiently processed to obtain the desired fiber length and consistency and suitable refined and bleached kraft fibers, the two kinds of fibers being thoroughly intermingled in the beater stage of the paper making operation. The sheet 21 is supported by a backing sheet 23 of greater structural strength and of greater filtering efficiency. The backing sheet 23 may be formed by similarly intermingling viscose rayon fibers and cotton linters. The fibers in the sheets and the fibrous sheets may be secured together by any suitable binder means. In the present instance it is proposed to form the multiphase or composite sheet 20 by employing by weight approximately 72½% of redwood bark fibers, 2½% of refined and bleached kraft fibers, 17% of second cut cotton linters, and 8% viscose rayon 3 den. $\%_{16}$ long fibers. To provide a binder it is proposed to add 19% phenolic formaldehyde resin and .12% of cationic melamine. Ammonium phosphate salts also may be added as a fireproofing agent. Such salts may be added in amounts from 10 to 15% and if added the percentage of resin may be reduced.

Paper of this kind may be made on either a cylinder or a modified Fourdrinier machine, both of which are now commonly used in the paper making art. It is preferable not to have extensive intermingling of the fibers in the different sections of the composite sheet inasmuch as this tends to reduce the efficiency of the filtering means for different purposes. As the filter 20 is disclosed the sheet 21 of redwood bark and kraft fibers is of lower porosity, of lesser structural strength, of higher dust retaining capacity and of lower dust separating efficiency than the backing sheet 23. The backing sheet supplements these properties of the sheet 21 to provide a composite sheet of greater porosity, greater structural strength, higher dust retaining capacity and greater dust separating efficiency.

It is proposed to pleat the composite sheet 20 to provide a filter such as that indicated and to so assemble the filter in the filter unit 16 that the redwood bark and kraft fiber sheet will face the inlet chamber 13. This will provide a filter unit of great dust cleaning capacity and high efficiency. It is possible to clean the filter merely by removing the filter unit 16 from the casing 11 and striking one of the end walls 17 sharply against the flat surface of any solid object to shake the dust from the sheet 21, or by using a reversely directed air blast on the filter. The filter unit then may be replaced in the casing 11 to serve for a greater time and until it may be considered desirable to throw the filter unit away and to replace the same with a new one.

I claim:

Filter means for cleaning air supplied to internal combustion engines and for similar purposes and comprising, a composite sheet adapted to be disposed transversely across a passage for air, said composite sheet being formed on the air supply and air distribution sides of said sheet of different fibrous materials, the fibrous material on the air supply side of said sheet comprising redwood bark and kraft fibers, the fibrous material on the air distribution side of said sheet comprising cotton linters and viscose rayon fibers, said fibers being bonded together and forming said composite sheet, said fibrous material comprising said cotton linters and viscose rayon fibers being of greater structural strength than said redwood bark and kraft fibers and largely supporting said red-wood bark and kraft fibers.

(References on following page)

References Cited in the file of this patent

UNITED STATES PATENTS

| | | | |
|---|---|---|---|
| 1,349,112 | Weiss | Aug. 10, 1920 |
| 1,898,027 | Winslow | Feb. 21, 1933 |
| 2,019,241 | Weiss | Oct. 29, 1935 |
| 2,372,437 | Lathrop et al. | Mar. 27 1945 |
| 2,389,435 | Karlstrom | Nov. 20, 1945 |
| 2,521,985 | Lang et al. | Sept. 12, 1950 |
| 2,664,964 | Asplund | Jan. 5, 1954 |
| 2,732,031 | Rabbitt et al. | Jan. 24, 1956 |
| 2,784,132 | Maisel | Mar. 5, 1957 |
| 2,813,596 | Voightman | Nov. 19, 1957 |
| 2,835,341 | Parker | May 20, 1958 |